United States Patent Office 2,891,936
Patented June 23, 1959

2,891,936

HIGH DENSITY POLYETHYLENE BY HIGH PRESSURE POLYMERIZATION WITH SMALL AMOUNTS OF ALDEHYDES

James E. Guillet and Harry W. Coover, Jr., Kingsport, Tenn., assignors to Eastman Kodak Company, Rochester, N.Y., a corporation of New Jersey No Drawing. Application June 12, 1956
Serial No. 590,812

16 Claims. (Cl. 260—94.9)

This invention relates to the manufacture of polyethylene and is particularly concerned with a high pressure polymerization process as described hereinafter whereby polyethylene having high density, high stiffness and high heat distortion temperatures not attained heretofore in high pressure processes is readily produced.

The commercial polyethylene produced and sold in increasing quantities in recent years has all been made by the so-called high pressure process using pressures in excess of 200 atmospheres and usually of the order of 500–1500 atmospheres as described by Fawcett et al. in U.S. 2,153,533. Various modifications have been introduced but the basic process has still been that of Fawcett et al. whereby solid polyethylene is produced having a density of 0.91–0.92, a tensile strenght at yield of 1100–1600 p.s.i., an elongation of 300–600 percent, a stiffness of 10,000–15,000 p.s.i., an average molecular weight of 15,000–40,000 and a heat distortion temperature of 100–110° C. Such a material has found widespread use in the manufacture of flexible films for packaging etc. and in flexible molded articles.

More recently, certain low pressure catalytic processes have been found which will give polyethylene of higher density and greater stiffness and strength which made the fabrication of rigid articles from polyethylene a possibility. Furthermore such high density polyethylene exhibited an increase in its heat distortion temperature whereby it was not adversely affected by boiling water. Such improved polyethylene, however, necessitates the use of different equipment, conditions, etc. and it has been an unfulfilled objective heretofore to achieve such improved properties using essentially the high pressure process which has already been developed into a large scale commercial manufacture.

It is accordingly an object of this invention to provide an improved high pressure process whereby polyethylene can be readily obtained having greatly improved density, stiffness, tensile and heat distortion temperature characteristics.

Another object of the invention is to provide a modified process whereby greatly improved polyethylene can be obtained using the apparatus and techniques already in commercial practice for large scale production of lower density polyethylene.

Another object of the invention is to provide a combination of reactants, reaction conditions and reaction influencing substances which give results in a high pressure process quite different that those achieved heretofore in high pressure ethylene polymerization.

Other objects will be apparent from the description and claims which follow.

These and other objects are attained by means of this invention wherein ethylene homopolymers having an average molecular weight of at least about 20,000, a density above 0.930, a stiffness above 25,000 p.s.i., a heat distortion temperature of at least 110° C. and an inherent melt viscosity in the range of 0.5–1.5 deciliters per gram in tetralin at 100° C. are manufactured by polymerizing ethylene at a pressure above 15,000 p.s.i. and a temperature of 80–180° C. in the presence of an ethylene polymerization catalyst and from 0.005 to 5% by weight based on the ethylene of an aldehyde as defined hereinafter.

Thus, in accordance with this invention, a new polyethylene is obtained which differs markedly from the usual high pressure polyethylene of commerce and also from the telomers of ethylene with aldehyde wherein a substantially greater proportion of aldehyde is employed under less stringent conditions to give compounds which are a chemical combination of the ethylene and the aldehyde. Under the conditions herein defined, the product obtained is essentially a homopolymer of ethylene consisting of carbon and hydrogen atoms whereby the greatly improved properties characteristic of this invention are obtained. Thus, for example, the conventional high pressure polyethylene has an average density of 0.91–0.92 whereas the polyethylene of this invention has an average density in the range of 0.93–0.95. The average molecular weight of conventional polyethylene is 15,000–40,000 whereas the present material has an average molecular weight of 20,000–200,000. The stiffness of conventional polyethylene is in the range of 10,000–15,000 p.s.i., with the best known material having a stiffness of 20,000 p.s.i. whereas the polyethylene of the present invention has a stiffness above 25,000 p.s.i. and usually of the order of 50,000–60,000 p.s.i. The heat distortion temperature of conventional polyethylene is in the range of 100–110° C. whereas the polyethylene of this invention has a heat distortion temperature of 110°–130° C. which makes its use in the presence of boiling water possible. The polyethylene of this invention is thus chemically identical with the conventional high pressure polyethylene but differs only in having a considerable increase in density which is a measure of increased crystallinity with a corresponding increase in physical properties.

Thus, by means of this invention, we have been able to produce by a slight modification of commercial high pressure processes, a polyethylene which is quite different from the usual low density flexible polymer ordinarily produced by such processes and also different from the modified polymers obtained by actually interacting ethylene with a substantial amount of a material which forms an ethylene telomer. The improved process embodying the invention is carried out at pressures of at least 15,000 p.s.i. with pressures of 15,000–50,000 p.s.i. being wholly operable and pressures of 15,000–30,000 p.s.i. and desirably about at least 20,000 p.s.i. being preferred. The process embodying the invention is carried out at temperatures within the range of 80–180° C., although somewhat lower or higher temperatures can sometimes be used by varying the pressure and catalyst concentration conditions. The products thus obtained are of high molecular weight and consist essentially of saturated hydrocarbon chains with a very low degree of chain branching. They contain no substantial amount of other functional groups such as oxygen or chlorine or other modifying group in the chain.

In practicing the invention, the improved results are achieved by effecting the polymerization in the presence of any of the well-known ethylene polymerization catalysts together with from 0.005 to 5% by weight based on the ethylene of an aldehyde from the group consisting of alkyl aldehydes of 2–7 carbon atoms, cyclohexanal, and phenyl substituted alkyl aldehydes wherein the alkyl group contains 2–7 carbon atoms. Thus the aldehydes employed in practicing the invention are used in relatively small amounts and are essentially saturated aliphatic aldehydes although the presence of phenyl groups as substituents on the alkyl chain does not deleteriously affect the course of the polymerization. Best results are obtained employing from 0.001 to 1.0% by weight based on the ethylene of such an essentially saturated aliphatic aldehyde, and the aldehydes which are suitably employed include acetaldehyde, propionaldehyde, n-butyraldehyde, cyclohexanal, 2-phenyl acetaldehyde and similar well known aldehydes as herein defined. The polymerization is carried out in the presence of from 5 parts per million to 5% by weight based on the ethylene of any of the well known polymerization catalysts for ethylene with the preferred range being from 10 to 100 parts per million of catalyst based on the ethylene. Thus, although any of the well known ethylene polymerization catalysts can be used, the catalysts desirably employed are the azo compounds or the organic peroxides. The peroxygen type catalysts which can be employed are typified by such materials as lauroyl peroxide, di-tert.-butyl peroxide, benzoyl peroxide, tertiary butyl perbenzoate, acetyl peroxide, tetralin peroxide, acetyl benzoyl peroxide, and similar well known organic peroxides, although other peroxy catalysts can be employed such as the alkali metal persulfates, perborates, percarbonates, and the like, although such other peroxy compounds are less preferably employed. The other preferred class of catalysts are the azo compounds, a large number of such azo catalysts for ethylene polymerization being well known in the art as shown in U.S. 2,471,959; 2,515,628; 2,520,338; 2,520,339 and 2,565,573. Any of these or similar azo catalysts can be employed in practicing the invention since the invention resides in the combination of the catalyst with the aldehyde under the conditions and in the concentrations herein disclosed to give the results herein defined rather than in the nature of the particular catalyst employed. To illustrate, such diverse azo catalysts as azobis isobutylronitrile, methyl azobisisobutyrate and diethyl 2,2'-azobis (2-methyl propionate) are equally useful in achieving the improved results embodying the invention.

The process embodying the invention can be effected in any of the conventional equipment for high pressure ethylene polymerization by single stage or multi-stage processes and by either gaseous or liquid dispersion polymerization in benzene or the like, with autoclave or elongated tubular reactors in accordance with usual practices. The pressures attained are achieved as usual by pressuring the reactor to the desired degree with ethylene. The usual polymer recovery processes are also applicable.

The invention is illustrated by the following examples which are not intended to limit the scope of the invention unless otherwise specifically indicated. In order to illustrate the best methods known heretofore for achieving high values of the characteristic properties of high pressure polyethylene and to furnish a further contrast to the improved results attained by means of this invention, Example 1 has been included illustrating the use of conventional peroxide and azo catalysts with and without the addition of benzene which has been previously employed for improving the properties.

*Example 1*

A solution of 0.008 part by weight of 2,2'-azobis-(2-methylpropionate) in 20 parts by volume of benzene was charged into a stainless steel autoclave of 100 cc. capacity which had been purged for 3 minutes with a stream of ethylene. The reactor was then closed and pressured to 20,000 p.s.i. with ethylene, and the polymerization effected at 100° C. for 2 hours. The reactor was then cooled readily to room temperature and vented. The polyethylene thereby obtained had an inherent viscosity of 2.08 deciliters per gram in tetralin at 100° C., a density of 0.929 and a stiffness of 20,000 p.s.i. This polymerization was also repeated using 0.004 part by weight of di-tert. butyl peroxide in place of the azo catalyst and carrying out the reaction at 140° C. and 20,000 p.s.i. The viscosity of the resulting product was 3.13, its density was 0.921, and it had a stiffness of 19,000 p.s.i. The polymerization was again repeated using 0.001 part by weight of di-tert.-butyl peroxide catalyst in benzene with a polymerization temperature of 80° C. and a pressure of 20,000 p.s.i. The resulting polyethylene had a viscosity of 2.4, a melt index of 0.0, a density of 0.923, and a stiffness of 20,000 p.s.i. Similar results were obtained using 0.009 part by weight of di-tert.-butyl peroxide to polymerize ethylene at 150° C. and 15,000 p.s.i. in the absence of any solvent. The polyethylene obtained in this manner did not differ appreciably from that previously described and had viscosity of 1.60 and a stiffness of 20,000 p.s.i.

*Example 2*

The greatly improved results achieved by means of this invention are illustrated by the following example which is in contrast to the results set out in Example 1. The autoclave was charged with 0.004 part by weight of di-tert.-butyl peroxide in 0.3 part by weight of propionaldehyde. The autoclave was pressured to 20,000 p.s.i. with ethylene and the polymerization effected at 140° C. for 2 hours. The solid polyethylene homopolymer thus obtained had a melt index of 0.66, an inherent viscosity of 0.84, a density of 0.941, and a stiffness of 58,000 p.s.i. The polymer softened in the range of 110–130° C. and had an average molecular weight in the range of 20,000–200,000. As can be seen from the greatly increased density, the crystallinity of the polymer was much higher than obtained with ordinary high pressure processes, and the polymer had unusual tensil strength. Because of its increased softening or heat distortion temperature coupled with the greatly increased stiffness and the excellent mold finish obtained, the polymer was useful for preparing molded articles having a good degree of rigidity, and the polymer thus was quite unlike the usual high pressure polyethylene or the derivatives of polyethylene wherein a substantial amount of the polymer chain is made up of other than hydrocarbon groups. The polymers embodying this invention consist essentially of hydrocarbon chains and thus are substantially identical chemically with the conventional polyethylene but differ markedly in physical properties.

*Example 3*

The alkyl aldehydes containing 2–7 carbon atoms in the alkyl group are desirably employed in practicing the invention, and similar results are obtained with any of the well known alkyl aldehydes as defined. Thus, the process of the preceding example was repeated using n-butyraldehyde instead of the propionaldehyde. The properties obtained in the resulting polyethylene closely parallelled those of the polyethylene described in the preceding example. For three successive batches, the average inherent viscosity was 0.78 and the density was 0.942. Thus it is apparent that by means of this invention densities are achieved which were not possible heretofore using high pressure polymerization processes. Whereas densities of not more than 0.93 were obtainable even with the best processes known heretofore, such as those employing benzene during the polymerization, the polymers embodying the present invention commonly have densities above 0.94 even in the absence of benzene or similar solvent. Furthermore, the stiffness of the polymers embodying this invention is above 25,000 p.s.i. and usually above 30,000 p.s.i. with stiffness values in the range of 40,000–60,000 p.s.i. being commonly obtained. These improved results are achieved by polymers which have excellent melt index characteristics and inherent viscosities in the range of 0.5–1.5 and commonly 0.5–1.0 deciliter per gram as measured in tetralin at 100° C.

*Example 4*

Although the use of an auxiliary solvent is not necessary, the process embodying this invention can also be carried out in the presence of a solvent such as benzene which is known to give improved properties. Thus, ethylene was polymerized at 140° C. and 20,000 p.s.i. pressure in the presence of 0.004 part by weight of di-tert.-butyl peroxide and 0.3 part by weight of n-butyraldehyde in 20 parts by volume of benzene. The resulting ethylene homopolymer had an inherent viscosity of 0.85 and a density of 0.941. Thus, the polyethylene embodying this invention has properties which resemble those of the low temperature, low pressure processes employing special catalysts. Under the conditions defined herein, the aldehyde which ordinarily has a deleterious effect on high pressure processing, is used in relatively small amounts to give high density polymers consisting essentially of hydrocarbons and quite different than the telomers of ethylene with aldehyde wherein a substantially greater proportion of aldehyde is employed.

Example 5

Ethylene was polymerized at 140° C. and 20,000 p.s.i. pressure in the stainless steel autoclave in the presence of 0.004 part by weight of di-tert.-butyl peroxide and 0.3 part by weight of propionaldehyde dissolved in 20 parts by volume of benzene. The resulting homopolymer of ethylene which had a molecular weight well above 20,000 exhibited an inherent viscosity of 0.94, a density of 0.940 and a stiffness of 55,000 p.s.i.

Example 6

As indicated hereinabove, the pressure can be varied over the range from a minimum of 15,000 p.s.i. to about 50,000 p.s.i., and the polymerization can be carried out at temperatures of 80–180° C. Usually the higher temperatures are employed without lowered pressures in order to achieve the improved results herein set out. Thus, ethylene was polymerized at 150° C. and 15,000 p.s.i. pressure in the 100 volume stainless steel autoclave containing 0.009 part by weight of di-tert.-butyl peroxide and 0.75 part by weight of propionaldehyde without any added solvent. After a polymerization period of 2 hours, 19.2 parts by weight of solid polyethylene was obtained having a viscosity of 0.40 and a density of 0.943.

Example 7

As has been indicated, any of the well known ethylene polymerization catalysts can be employed in practicing the invention with the peroxy catalysts and the azo catalysts being preferred. Thus, ethylene was polymerized as described at 100° C. and 20,000 p.s.i. pressure in the presence of 0.008 part by weight of diethyl 2,2'-azobis-(2-methylpropionate) and 0.3 part by weight of propionaldehyde dissolved in 20 parts by volume of benzene. The resulting solid polymer consisting essentially of polyethylene was obtained in a yield of 8.7 parts by weight after 2 hours, and the polymer had a density of 0.953 and a viscosity of 0.95.

Example 8

Other aldehydes as described herein were found to give similar results. Thus, ethylene was polymerized at 140° C. and 20,000 p.s.i. pressure in the presence of 0.004 part by weight of di-tert.-butyl peroxide and 0.3 part by weight of acetaldehyde. The resulting highly crystalline polyethylene had a density of 0.943 and an inherent viscosity of 0.90.

Example 9

The aldehydes employed in practicing the invention are characterized by a saturated hydrocarbon chain joined to the carbonyl group but substituted derivatives can be used wherein a phenyl group is attached as a side chain substituent to the alkyl group with good results. Thus, the process of the preceding example was repeated using 0.2 part by weight of 2-phenyl acetaldehyde in place of the acetaldehyde. The resulting ethylene homopolymer had a density of 0.947 and a viscosity of 0.79. The saturated cyclicaldehyde, cyclohexanal, can also be employed with good results. Thus, the polymerization described was repeated using 0.15 part by weight of cyclohexanal instead of the acetaldehyde. The resulting polymer had a density of 0.943 and a viscosity of 0.70.

Thus by means of this invention polyethylene is obtained exhibiting greatly improved density (and correspondingly increased crystallinity) much higher heat distortion temperatures than conventional high pressure polyethylene, and much greater rigidity and tensile strength than obtainable heretofore by high pressure polymerization. The results obtained were particularly surprising and appeared to depend upon the combination of conditions, reactants and reaction promoting materials as defined herein since ordinarily smaller amounts of aldehydes are deleterious in high pressure polymerization processes and larger amounts give polyethylene derivatives which are much more waxy in character and which have lower softening temperatures than do even the conventional high pressure polyethylenes. The process of the invention is readily effected in available high pressure polymerization equipment, and the known techniques for commercial manufacture are applicable. The greatly changed characteristics of the polyethylene obtained by means of this invention markedly widens the field of use of high pressure polyethylene and makes possible the production of a much wider range of polymeric products without the necessity of employing quite dissimilar processes for their production.

Although the invention has been described in detail with reference to certain preferred embodiments thereof, variations and modifications can be effected within the spirit and scope of the invention as described hereinabove and as defined in the appended claims.

We claim:

1. The method of polymerizing ethylene to form an improved solid ethylene homopolymer having an average molecular weight of at least about 20,000, a density above 0.930, a stiffness above 25,000 p.s.i., a heat distortion temperature of at least 110° C. and an inherent melt viscosity in the range of 0.5–1.5 deciliters per gram in tetralin at 100° C. which comprises polymerizing ethylene at a pressure above 15,000 p.s.i. and a temperature of 80–180° C. in the presence of an ethylene polymerization catalyst from the group consisting of organic peroxides and azo compounds and from 0.005 to 5% by weight based on said ethylene of an aldehyde from the group consisting of alkyl aldehydes of 2–7 carbon atoms, cyclohexanal and phenyl substituted alkyl aldehydes wherein the alkyl aldehyde contains 2–7 carbon atoms, the amount of formaldehyde, alcohols, ethers, ketones and acids in the polymerization mixture being below 0.005%.

2. The method of polymerizing ethylene to form an improved solid ethylene homopolymer having an average molecular weight of at least about 20,000, a density above 0.930, a stiffness above 25,000 p.s.i., a heat distortion temperature of at least 110° C. and an inherent melt viscosity in the range of 0.5–1.5 deciliters per gram in tetralin at 100° C. which comprises polymerizing ethylene at a pressure of 15,000–30,000 p.s.i. and a temperature of 80–180° C. in the presence of from 5 parts per million to 5% by weight based on said ethylene of an ethylene polymerization catalyst from the group consisting of organic peroxides and azo compounds, and in the presence of from 0.005 to 1.0% by weight based on said ethylene of a saturated aliphatic aldehyde containing 2 carbon atoms, the amount of formaldehyde, alcohols, ethers, ketones and acids in the polymerization mixture being below 0.005%.

3. The method of polymerizing ethylene to form an improved solid ethylene homopolymer having an average molecular weight of at least about 20,000, a density above 0.930, a stiffness above 25,000 p.s.i., a heat distortion temperature of at least 110° C. and an inherent melt viscosity in the range of 0.5–1.5 deciliters per gram in tetralin at 100° C. which comprises polymerizing ethylene at a pressure of 15,000–30,000 p.s.i. and a temperature of 80–180° C. in the presence of from 5 parts per million to 5% by weight based on said ethylene of an ethylene polymerization catalyst from the group consisting of organic peroxides and azo compounds, and in the presence of from 0.005 to 1% by weight based on said ethylene of a saturated aliphatic aldehyde containing 3 carbon atoms, the amount of formaldehyde, alcohols, ethers, ketones and acids in the polymerization mixture being below 0.005%.

4. The method of polymerizing ethylene to form an improved solid ethylene homopolymer having an average molecular weight of at least about 20,000, a density above 0.930, a stiffness above 25,000 p.s.i., a heat distortion temperature of at least 110° C. and an inherent melt viscosity in the range of 0.5–1.5 deciliters per gram in tetralin at 100° C. which comprises polymerizing ethylene at a pressure of 15,000–30,000 p.s.i. and a temperature of 80–180° C. in the presence of from 5 parts per million to 5% by weight based on said ethylene of an ethylene polymerization catalyst from the group consisting of organic peroxides and azo compounds, and in the presence of from .005 to 1% by weight based on said ethylene of a saturated aliphatic aldehyde containing 4 carbon atoms, the amount of formaldehyde, alcohols, ethers, ketones and acids in the polymerization mixture being below 0.005%.

5. The method of polymerizing ethylene to form an improved solid ethylene homopolymer having an average molecular weight of 20,000–200,000, a density above 0.930, a stiffness above 25,000 p.s.i., a heat distortion temperature in the range of 110–130° C., and an inherent melt viscosity in the range of 0.5–1.5 deciliters per gram in tetralin at 100° C. which comprises polymerizing ethylene at a pressure of about 20,000 p.s.i. and a temperature of 80–180° C. in the presence of from 10 to 100 parts per million parts of ethylene of an ethylene polymerization catalyst from the group consisting of organic peroxides and azo compounds and in the presence of from 0.005 to 1% by weight based on said ethylene of acetaldehyde, the amount of formaldehyde, alcohols, ethers, ketones and acids in the polymerization mixture being below 0.005%.

6. The method of polymerizing ethylene to form an improved solid ethylene homopolymer having an average molecular weight of 20,000–200,000, a density above 0.930, a stiffness above 25,000 p.s.i., a heat distortion temperature in the range of 110–130° C., and an inherent melt viscosity in the range of 0.5–1.5 deciliters per gram in tetralin at 100° C. which comprises polymerizing ethylene at a pressure of about 20,000 p.s.i. and a temperature of 80–180° C. in the presence of from 10 to 100 parts per million parts of ethylene of an ethylene polymerization catalyst from the group consisting of organic peroxides and azo compounds and in the presence of from 0.005 to 1% by weight based on said ethylene of propionaldehyde, the amount of formaldehyde, alcohols, ethers, ketones and acids in the polymerization mixture being below 0.005%.

7. The method of polymerizing ethylene to form an improved solid ethylene homopolymer having an average molecular weight of 20,000–200,000, a density above 0.930, a stiffness above 25,000 p.s.i., a heat distortion temperature in the range of 110–130° C., and an inherent melt viscosity in the range of 0.5–1.5 deciliters per gram in tetralin at 100° C. which comprises polymerizing ethylene at a pressure of about 20,000 p.s.i. and a temperature of 80–180° C. in the presence of from 10 to 100 parts per million parts of ethylene of an ethylene polymerization catalyst from the group consisting of organic peroxides and azo compounds and in the presence of from 0.005 to 1% by weight based on said ethylene of n-butyraldehyde, the amount of formaldehyde, alcohols, ethers, ketones and acids in the polymerization mixture being below 0.005%.

8. The method of polymerizing ethylene to form an improved solid ethylene homopolymer having an average molecular weight of 20,000–200,000, a density above 0.930, a stiffness above 25,000 p.s.i., a heat distortion temperature in the range of 110–130° C., and an inherent melt viscosity in the range of 0.5–1.5 deciliters per gram in tetralin at 100° C. which comprises polymerizing ethylene at a pressure of about 20,000 p.s.i. and a temperature of 80–180° C. in the presence of from 10 to 100 parts per million parts of ethylene of an ethylene polymerization catalyst from the group consisting of organic peroxides and azo compounds and in the presence of from 0.005 to 1% by weight based on said ethylene of cyclohexanal, the amount of formaldehyde, alcohols, ethers, ketones and acids in the polymerization mixture being below 0.005%.

9. The method of polymerizing ethylene to form an improved solid ethylene homopolymer having an average molecular weight of 20,000–200,000, a density above 0.930, a stiffness above 25,000 p.s.i., a heat distortion temperature in the range of 110–130° C., and an inherent melt viscosity in the range of 0.5–1.5 deciliters per gram in tetralin at 100° C. which comprises polymerizing ethylene at a pressure of about 20,000 p.s.i. and a temperature of 80–180° C. in the presence of from 10 to 100 parts per million parts of ethylene of an ethylene polymerization catalyst from the group consisting of organic peroxides and azo compounds and in the presence of from 0.005 to 1% by weight based on said ethylene of 2-phenylacetaldehyde, the amount of formaldehyde, alcohols, ethers, ketones and acids in the polymerization mixture being below 0.005%.

10. The method of polymerizing ethylene to form an improved solid ethylene homopolymer having an average molecular weight in the range of 20,000–200,000, a density of at least 0.940, a stiffness above 30,000 p.s.i., a heat distortion temperature in the range of 110–130° C. and an inherent viscosity in the range of 0.5–1.5 deciliters per gram in tetralin at 100° C. which comprises polymerizing ethylene at a pressure of about 20,000–30,000 p.s.i. and a temperature of 80–180° C. in the presence of from 10 to 100 parts per million parts of ethylene of di-tert.-butyl peroxide and from 0.005 to 1% by weight based on said ethylene of n-butyraldehyde, the amount of formaldehyde, alcohols, ethers, ketones and acids in the polymerization mixture being below 0.005%.

11. The method of polymerizing ethylene to form an improved solid ethylene homopolymer having an average molecular weight in the range of 20,000–200,000, a density of at least 0.940, a stiffness above 30,000 p.s.i., a heat distortion temperature in the range of 110–130° C. and an inherent viscosity in the range of 0.5–1.5 deciliters per gram in tetralin at 100° C. which comprises polymerizing ethylene at a pressure of about 20,000–30,000 p.s.i. and a temperature of 80–180° C. in the presence of from 10 to 100 parts per million parts of ethylene of di-tert.-butyl peroxide and from 0.005 to 1% by weight based on said ethylene of propionaldehyde, the amount of formaldehyde, alcohols, ethers, ketones and acids in the polymerization mixture being below 0.005%.

12. The method of polymerizing ethylene to form an improved solid ethylene homopolymer having an average molecular weight in the range of 20,000–200,000, a density of at least 0.940, a stiffness above 30,000 p.s.i., a heat distortion temperature in the range of 110–130° C. and an inherent viscosity in the range of 0.5–1.5 deciliters per gram in tetralin at 100° C. which comprises polymerizing ethylene at a pressure of about 20,000–30,000 p.s.i and a temperature of 80–180° C. in the presence of from 10 to 100 parts per million parts of ethylene of di-tert.-butyl peroxide and from 0.005 to 1% by weight based on said ethylene of acetaldehyde, the amount of formaldehyde, alcohols, ethers, ketones and acids in the polymerization mixture being below 0.005%.

13. The method of polymerizing ethylene to form an improved solid ethylene homopolymer having an average molecular weight in the range of 20,000–200,000, a density of at least 0.940, a stiffness above 30,000 p.s.i., a heat distortion temperature in the range of 110–130° C. and an inherent viscosity in the range of 0.5–1.5 deciliters per gram in tetralin at 100° C. which comprises polymerizing ethylene at a pressure of about 20,000–30,000 p.s.i. and a temperature of 80–180° C. in the presence of from 10 to 100 parts per million parts of ethylene of diethyl 2,2'-azobis(2-methyl propionate) and from 0.005 to 1% by weight based on said ethylene of propionaldehyde, the amount of formaldehyde, alcohols, ethers, ketones and acids in the polymerization mixture being below 0.005%.

14. The method of polymerizing ethylene to form an improved solid ethylene homopolymer having an average molecular weight in the range of 20,000–200,000, a density of at least 0.940, a stiffness above 30,000 p.s.i., a heat distortion temperature in the range of 110–130° C. and an inherent viscosity in the range of 0.5–1.5 deciliters per gram in tetralin at 100° C. which comprises polymerizing ethylene at a pressure of about 20,000–30,000 p.s.i. and a temperature of 80–180° C. in the presence of from 10 to 100 parts per million parts of ethylene of di-tert.-butyl peroxide and from 0.005 to 1% by weight based on said ethylene of propionaldehyde, said polymerization being effected in benzene, the amount of formaldehyde, alcohols, ethers, ketones and acids in the polymerization mixture being below 0.005%.

15. The method of polymerizing ethylene to form an improved solid ethylene homopolymer having an average molecular weight in the range of 20,000–200,000, a density of at least 0.940, a stiffness above 30,000 p.s.i., a heat distortion temperature in the range of 110–130° C. and an inherent viscosity in the range of 0.5–1.5 deciliters per gram in tetralin at 100° C. which comprises polymerizing ethylene at a pressure of about 20,000–30,000 p.s.i. and a temperature of 80–180° C. in the presence of from 10 to 100 parts per million parts of ethylene of diethyl 2,2'-azobis(2-methyl propionate) and from 0.005 to 1% by weight based on said ethylene of propionaldehyde, said polymerization being effected in benzene, the amount of formaldehyde, alcohols, ethers, ketones and acids in the polymerization mixture being below 0.005%.

16. The method of polymerizing ethylene to form an improved solid ethylene homopolymer having an average molecular weight in the range of 20,000–200,000, a density of at least 0.940, a stiffness above 30,000 p.s.i., a heat distortion temperature in the range of 110–130° C. and an inherent viscosity in the range of 0.5–1.5 deciliters per gram in tetralin at 100° C. which comprises polymerizing ethylene at a pressure of about 20,000–30,000 p.s.i. and a temperature of 80–180° C. in the presence of from 10 to 100 parts per million parts of ethylene of di-tert.-butyl peroxide and from 0.005 to 1% by weight based on said ethylene of n-butyraldehyde, said polymerization being effected in benzene, the amount of formaldehyde, alcohols, ethers, ketones and acids in the polymerization mixture being below 0.005%.

References Cited in the file of this patent

FOREIGN PATENTS

| | | |
|---|---|---|
| 469,547 | Canada | Nov. 21, 1950 |
| 502,597 | Canada | May 18, 1954 |